US006721383B2

(12) United States Patent
Casillas et al.

(10) Patent No.: US 6,721,383 B2
(45) Date of Patent: Apr. 13, 2004

(54) MAXIMUM EXTENDED LOAD LINE LIMIT ANALYSIS FOR A BOILING WATER NUCLEAR REACTOR

(75) Inventors: Jose L. Casillas, Cupertino, CA (US); Eugene C. Eckert, Los Gatos, CA (US); Phuong T. Tran, Pleasanton, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,335

(22) Filed: Dec. 14, 2001

(65) Prior Publication Data

US 2004/0013220 A1 Jan. 22, 2004

Related U.S. Application Data

(63) Continuation-in-part of application No. 09/475,592, filed on Dec. 30, 1999.

(51) Int. Cl.⁷ .............................................. G21C 17/00
(52) U.S. Cl. ...................... 376/245; 376/207; 376/210; 376/219; 376/246; 376/247
(58) Field of Search ................................. 376/245, 246, 376/247

(56) References Cited

U.S. PATENT DOCUMENTS

| | | | |
|---|---|---|---|
| 5,200,139 A | | 4/1993 | Mourlevat et al. |
| 5,293,411 A | | 3/1994 | Miyamoto et al. |
| 5,524,128 A | | 6/1996 | Mowry et al. |
| 5,528,639 A | | 6/1996 | Eckert et al. |
| 5,619,433 A | * | 4/1997 | Wang et al. .................. 703/18 |
| 5,682,410 A | * | 10/1997 | McGrady et al. ........... 376/246 |
| 5,912,933 A | * | 6/1999 | Shaug et al. ................. 376/216 |
| 5,953,238 A | | 9/1999 | Mowry et al. |
| 6,198,786 B1 | * | 3/2001 | Carroll et al. .............. 376/211 |

OTHER PUBLICATIONS

Bartos, "Pushing nuclear plants to their design power ratings," Power, May 1993, pp. 70–74.
Legath, et al., "Power uprating in Asea–Atom BWRs," Nuclear Europe, Mar. 1985, pp. 21–22.
Sheranko, "Power uprate testing at PP&L's Susquehanna units," Trans.Am. Nuclear Society, 1196, p. 321, vol. 74.
Rogers et al., "Application of design margins for BWR power uprate," Trans.Am. Nuclear Society, 1985, p. 387, vol. 50.
U.S. Nuclear Regulatory Commission, Appendix A to Part 50—General Design Criteria for Nuclear Power Plants, pp. 1–11.
U.S. Nuclear Regulatory Commission, Standard Review Plan for Review of License Renewal Application Nuclear Power Plants (NUREG–1800), pp. 1–170.

* cited by examiner

Primary Examiner—R Palabrica
(74) Attorney, Agent, or Firm—Armstrong Teasdale LLP

(57) ABSTRACT

A computerized method for expanding the operating domain of a boiling water nuclear reactor that permits safe operation of the reactor at core flows lower than normal operating parameters is provided. The operating domain is characterized by a map of the reactor thermal power and core flow. The computerized method includes determining by computer simulation a load line characteristic that is elevated over normal operating parameters and that increases reactor performance over normal operating parameters, performing safety evaluations by computer simulation at the elevated load line to determine compliance with safety design parameters, and performing operational evaluations by computer simulation at the elevated load line.

12 Claims, 3 Drawing Sheets

MAXIMUM EXTENDED LOAD LINE LIMIT ANALYSIS FOR A BOILING WATER NUCLEAR REACTOR

CROSS REFERENCE TO RELATED APPLICATIONS

This application is a Continuation-In-Part of U.S. patent application Ser. No. 09/475,592, filed Dec. 30, 1999.

BACKGROUND OF INVENTION

This invention relates generally to nuclear reactors and more particularly to a design analysis method that permits operation of a boiling water nuclear reactor in an expanded region of the power/core flow map.

A typical boiling water reactor (BWR) includes a pressure vessel containing a nuclear fuel core immersed in circulating coolant, i.e., water, which removes heat from the nuclear fuel. The water is boiled to generate steam for driving a steam turbine-generator for generating electric power. The steam is then condensed and the water is returned to the pressure vessel in a closed loop system. Piping circuits carry steam to the turbines and carry recirculated water or feedwater back to the pressure vessel that contains the nuclear fuel.

The BWR includes several conventional closed-loop control systems that control various individual operations of the BWR in response to demands. For example a control rod drive control system (CRDCS) controls the position of the control rods within the reactor core and thereby controls the rod density within the core which determines the reactivity therein, and which in turn determines the output power of the reactor core. A recirculation flow control system (RFCS) controls core flow rate, which changes the steam/water relationship in the core and can be used to change the output power of the reactor core. These two control systems work in conjunction with each other to control, at any given point in time, the output power of the reactor core. A turbine control system (TCS) controls steam flow from the BWR to the turbine based on pressure regulation or load demand.

The operation of these systems, as well as other BWR control systems, is controlled utilizing various monitoring parameters of the BWR. Some monitoring parameters include core flow and flow rate effected by the RFCS, reactor system pressure, which is the pressure of the steam discharged from the pressure vessel to the turbine that can be measured at the reactor dome or at the inlet to the turbine, neutron flux or core power, feedwater temperature and flow rate, steam flow rate provided to the turbine and various status indications of the BWR systems. Many monitoring parameters are measured directly, while others, such as core thermal power, are calculated using measured parameters. Outputs from the sensors and calculated parameters are input to an emergency protection system to assure safe shutdown of the plant, isolating the reactor from the outside environment, if necessary, and preventing the reactor core from overheating during any emergency event.

To meet regulatory licensing guidelines, the thermal output of the reactor is limited as the percentage of maximum core flow decreases. A line characterized by this percent of thermal power output versus percent of core flow defines the upper boundary of the reactor safe operating domain. Some reactors have been licensed to operate with increased thermal power output (up-rated) with an upper boundary line characterized by the point of 100 percent original rated power and 75 percent of rated core flow. This upper boundary line constrains operation at the uprated power to a significantly smaller range of core flow and reduces flexibility during startup and at full power.

SUMMARY OF INVENTION

In one aspect, a computerized method for expanding the operating domain of a boiling water nuclear reactor that permits safe operation of the reactor at core flows lower than normal operating parameters is provided. The operating domain is characterized by a map of the reactor thermal power and core flow. The computerized method includes determining by computer simulation a load line characteristic that is elevated over normal operating parameters and that increases reactor performance over normal operating parameters, performing safety evaluations by computer simulation at the elevated load line to determine compliance with safety design parameters, and performing operational evaluations by computer simulation at the elevated load line.

In another aspect, a system for controlling a boiling water nuclear reactor is provided. The system includes a computer configured to determine a set of operating characteristics for the reactor in an upper operating region above 100 percent of a rated core thermal power by simulation, evaluate an expected performance of the reactor throughout the upper operating region by simulation, and determine limits for the reactor that are to be observed within the upper operating region by simulation.

DETAILED DESCRIPTION

Figure 1:
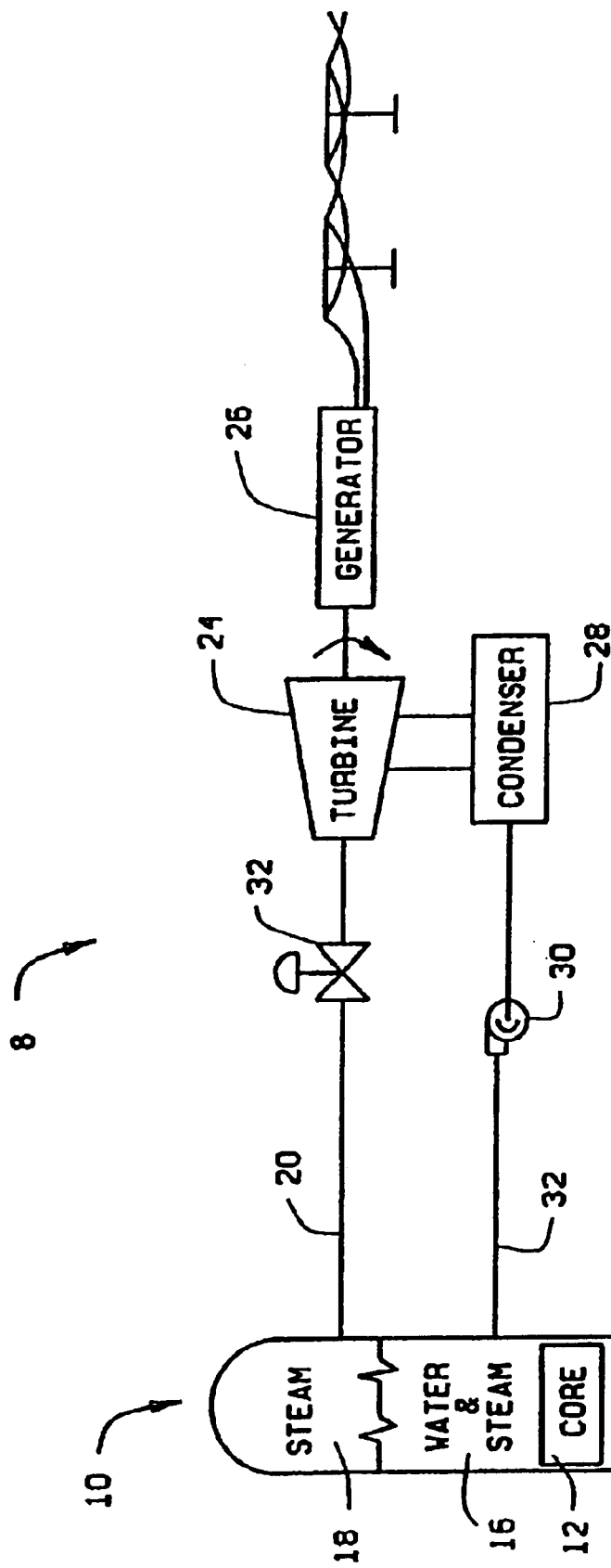
FIG. 1 is a schematic diagram of the basic components of a power generating system that contains a turbine-generator and a boiling water nuclear reactor.

FIG. 1 is a schematic diagram of the basic components of a power generating system 8. The system includes a boiling water nuclear reactor 10 which contains a reactor core 12. Water 14 is boiled using the thermal power of reactor core 12, passing through a water-steam phase 16 to become steam 18. Steam 18 flows through piping in a steam flow path 20 to a turbine flow control valve 22 which controls the amount of steam 18 entering steam turbine 24. Steam 18 is used to drive turbine 24 which in turn drives electric generator 26 creating electric power. Steam 18 flows to a condenser 28 where it is converted back to water 14. Water 14 is pumped by feedwater pump 30 through piping in a feedwater path 32 back to reactor 10.

Figure 2:
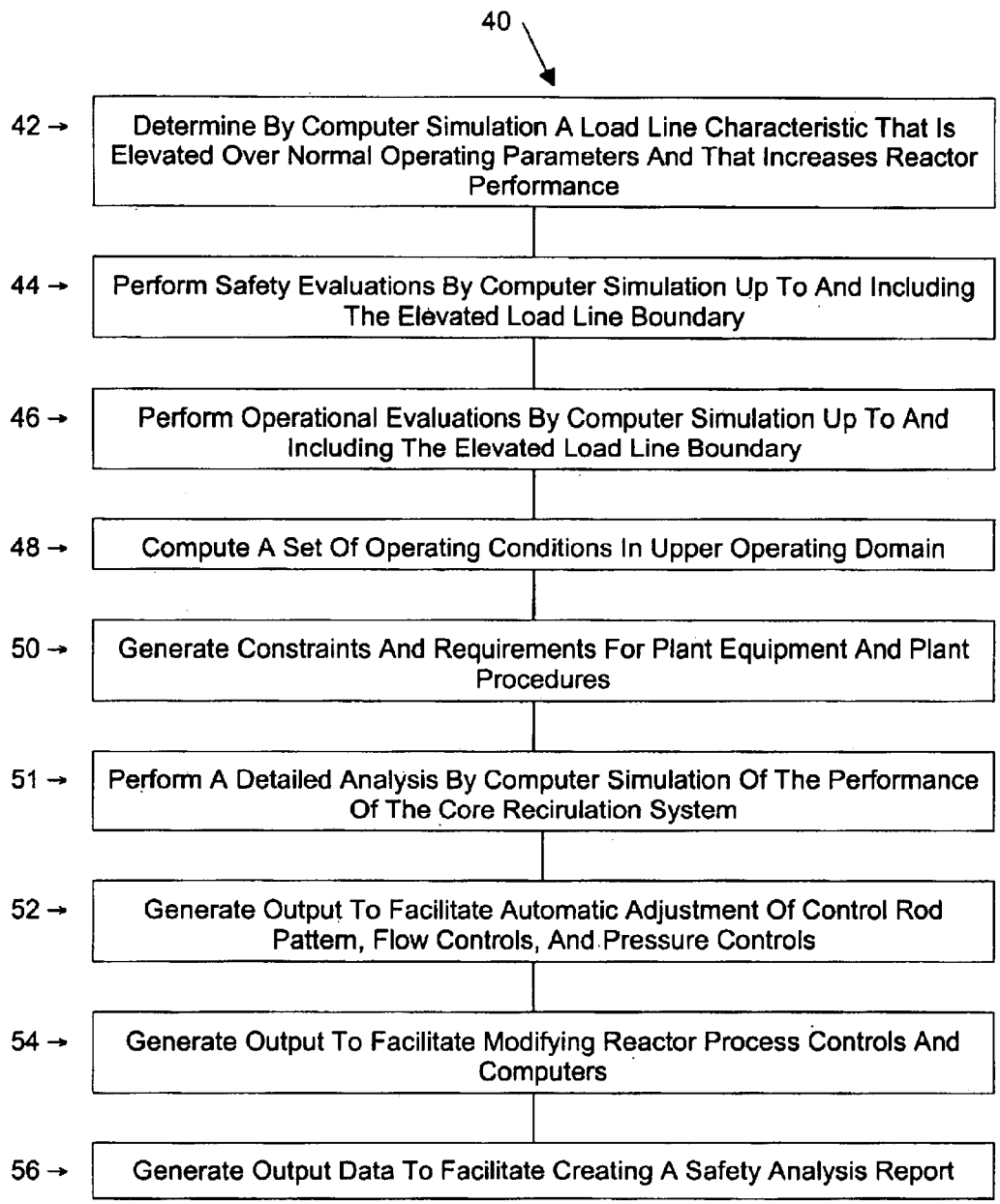
FIG. 2 is a flow chart of a computerized method for expanding the operating domain of the boiling water nuclear reactor shown in FIG. 1 in accordance with an embodiment of the present invention.

FIG. 2 is a flow chart of a method 40 for expanding the operating domain of boiling water nuclear reactor 10. In one aspect, method 40 is applicable to boiling water nuclear reactor plants which can operate at higher than the original rated thermal power, where the fuel cycle performance at the higher load line is advantageous and plant performance at the higher power output is justified by appropriate safety analysis. In another aspect, method 40 provides the design concept and the analytical justification to operate boiling water nuclear reactor 10 in a significantly expanded region of the power/flow map. Computerized method 40, in an exemplary embodiment, is web enabled and is run on a business entity's intranet. In a further exemplary embodiment, computerized method 40 is fully accessed by individuals having authorized access outside the firewall of the business entity through the Internet. In another exemplary embodiment, computerized method 40 is run in a Windows NT environment or simply on a stand alone computer system having a CPU, memory, and user interfaces. In yet another exemplary embodiment, computerized method 40 is practiced by simply utilizing spreadsheet software.

Method 40 includes the steps of determining 42 by computer simulation a load line characteristic that is elevated over normal operating parameters and that increases reactor performance over normal operating parameters, performing 44 safety evaluations by computer simulation at the elevated load line to determine compliance with safety design parameters, and performing 46 operational evaluations by computer simulation at the elevated load line. Method 40 also includes the step of computing 48 a set of operating conditions for the reactor in an upper operating domain characterized by the elevated load line.

Based on the results of the operational evaluations of step 46, constraints and requirements are generated 50 for plant equipment and procedures. Also, a detailed analysis by computer simulation is performed 51 of the core recirculation system. The optimum applicable range of the expanded region of operation is established. Also, output is generated 52 to facilitate automatic adjustment of the control rod pattern, the flow controls, and the pressure controls based on the detection of a reactor transient. Additionally, method 40 includes generating 54 output to facilitate the modification of the reactor process controls and computers to permit reactor operation in the upper operating domain.

To determine the desired elevated load line characteristic, evaluations at elevated core thermal power are performed. The desired load line increase is based on the thermal power increase and the fuel cycle performance improvement that is obtained at the elevated core thermal power. Computer simulation of the reactor are used to define the operating conditions of the reactor in the new operating region characterized by the elevated load line. Evaluations of the expected performance of the reactor throughout the new operating region are also performed using computer simulation.

Operational evaluations performed at the elevated load line include, but are not limited to, evaluating plant maneuvers, frequent plant transients, plant fuel operating margins, operator training and plant equipment response and setpoints. Based on the results of the operational evaluations, constraints and requirements are established for plant equipment and procedures.

For example, evaluating core and fuel performance impact at increased power output includes determining anticipated transient without scram (ATWS) events for increased core thermal power output Some (ATWS) events include Main Steam Isolation Valve Closure (MSIVC); Pressure Regulator Failure-Open (PRFO); Loss of Offsite Power (LOOP); and Inadvertent Opening of a Relief Valve (IORV). The analysis takes into account ATWS mitigating features, such as, the recirculation pump trip (RPT), alternate rod insertion (ARI), and the Standby Liquid Control System (SLCS) performace. Plots of important parameters are created, and the peak values of neutron flux, average fuel heat flux and vessel pressure are calculated for each of the four events.

Safety evaluations typically address the safety analysis Chapter 15 of the Final Safety Analysis Report (FSAR). Additionally, non-Chapter 15 safety issues such as containment integrity, stability and anticipated transient without scram (ATWS) are addressed. Safety analysis include demonstration of compatibility with the previous resolutions of reactor stability monitoring and mitigation of unplanned events. The safety evaluations are performed such that compliance to plant design criteria is demonstrated. Assurance of acceptable protection of the reactor and the public is performed and documented to satisfy regulatory authorities. Method 40 includes generating 56 output data to facilitate creating a safety analysis report to comply with regulatory requirements.

For example, a review of the existing plant Safety Analysis Report and reload transients is conducted at the uprated conditions. Where necessary, analyses are performed to demonstrate compliance with the fuel thermal margin requirements and other applicable transient criteria. Of primary importance is an analysis of the transient events which are most limiting from the viewpoint of fuel thermal margin. Analysis of these most limiting events for uprated power at the most limiting conditions on the operating power/flow map will assure that fuel operating limits are met.

A safety analysis includes a broad set of transient events that include:(1)Decrease in Core Coolant Temperature.(2) Increase in Reactor Pressure.(3)Decrease in Reactor Core Coolant Flow Rate.(4)Increase in Core Flow Rate.(5) Increase in Reactor Coolant Inventory.(6)Decrease in Reactor Coolant Inventory.(7)Increase in Reactivity.(8)Increase in Core Coolant Temperature.

Evaluations are performed to show continued compliance with the nuclear regulatory agency rule on anticipated transient without scram performance (ATWS). ATWS rule compliance primarily involves alternate shutdown equipment which has been previously installed at each unit. The equipment remains and its performance at any changed conditions (due to uprate) is evaluated, for example at higher operating pressure. Where applicable, a bounding case is reanalyzed at the uprated power to confirm that adequate overpressure protection and suppression pool cooling are maintained for limiting cases in each BWR product line. This analysis also includes evaluation of any changes in pressure setpoints of the safety/relief valves and/or high pressure recirculation pump trip. In some cases these setpoints, as well as the allowable number of relief valves out of service may be re-optimized to improve the ATWS response. Power uprate operation does not significantly affect the long-term ATWS response because it does not involve a uniquely higher rod line, and, therefore, there is no increase in the power level following the ATWS recirculation pump trip.

Radiological consequences are evaluated or analyzed for uprated power conditions. This evaluation/analysis is based on the methodology, assumptions, and analytical techniques described in previous Safety Evaluations (SEs). The evaluation of radiological consequences includes the effect of a higher power level. In general, the radiation sources inside the fuel rods, creation of activation products outside of the fuel rods, and concentration of coolant activation activities are directly proportional to the thermal power. Therefore, the original radiation inventories, expressed in terms of curies per megawatt of thermal power, will bound the uprated condition, provided that the core design, fuel loading, and mean exposure are not changed significantly. If significant changes to the fuel loading or design parameters are made to optimize for uprated conditions, the uprate license application will re-perform the radiological evaluation to account for changes to the isotopic concentrations in the fuel. Issues relating to burnup and enrichment also need to be addressed if the uprated burnup and enrichment are to exceed any regulated conditions.

During normal operation, the radiation levels in the plant are the result of radiation streaming from the reactor vessel or from radioisotopes carried in the reactor water, steam, or radwaste process. In all cases, these quantities are approximately proportional to core thermal power. Increases in normal radiological releases from routine operation are considered in the power uprate amendment requests.

The magnitude of the potential radiological consequences of a design basis accident (DBA) is proportional to the quantity of fission products released to the environment. This quantity is a product of the activity released from the core and the transport mechanisms between the core and the effluent release point. For a steam line break or instrument line break accident, the radiological consequences will be, at most, proportional to the increase in power, since (1) the quantity of activity in the primary coolant and in the offgas is unaffected by power uprate (it is limited by Technical Specifications), and (2) the increase in coolant mass discharged to the environment is dependent on reactor pressure, which increases less than the power increase. For the remaining DBAs, the radiological releases are expected to increase, at most, by the amount of power uprate, since the only parameter of importance is the actual inventory of radioisotopes in the fuel rod and the mechanism of fuel failure is not likely to be influenced by power uprate. In some cases, the magnitude of the uprate may be limited, to maintain the radiological consequences below regulatory guidelines.

To maximize the ability of the boiling water reactor unit to avoid trip during transients that may occur while operating in the extended region, automatic adjustment of some controls is provided. For example automatic adjustment of the control rod pattern, flow controls and pressure controls based on sensing the initiation of a transient, such as a pump trip, are provided. These automatic controls improve plant availability, even in the previous range of reactor operation.

Figure 3:
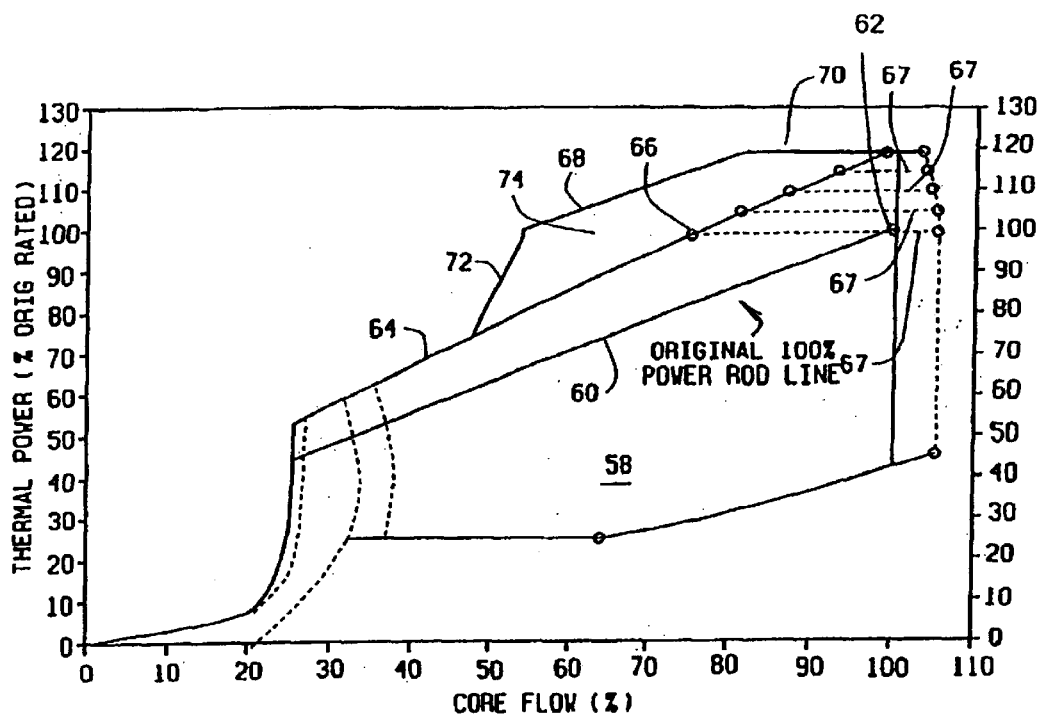
FIG. 3 is a graph of the percent of rated thermal power versus core flow illustrating an expanded operating domain of the boiling water reactor shown in FIG. 1.

An operating domain 58 of reactor 10 is characterized by a map of the reactor thermal power and core flow as illustrated in FIG. 3. Typically, reactors are licensed to operate below a flow control/rod line 60 characterized by an operating point 62 defined by 100 percent of the original rated thermal power and 100 percent of rated core flow. In some circumstances, reactors are licensed to operate with a larger domain, but are restricted to operation below a flow control/rod line 64 characterized by an operating point 66 defined by 100 percent of the original rated thermal power and 75 percent of rated core flow. Some reactors have been licensed to operate at higher power as illustrated by lines 67 in FIG. 3. However, these reactors are constrained by flow control/rod boundary line 64. In an exemplary embodiment of the present invention, method 40 expands operating domain 58 of reactor 10 and permits operation of reactor 10 between about 120 percent of original rated thermal power and about 85 percent of rated core flow to about 100 percent of original rated thermal power and about 55 percent of rated core flow. Lines 68, 70 and 72 represents this new upper boundary of an upper operating region 74 of operating domain 58 of reactor 10.

Figure 4:
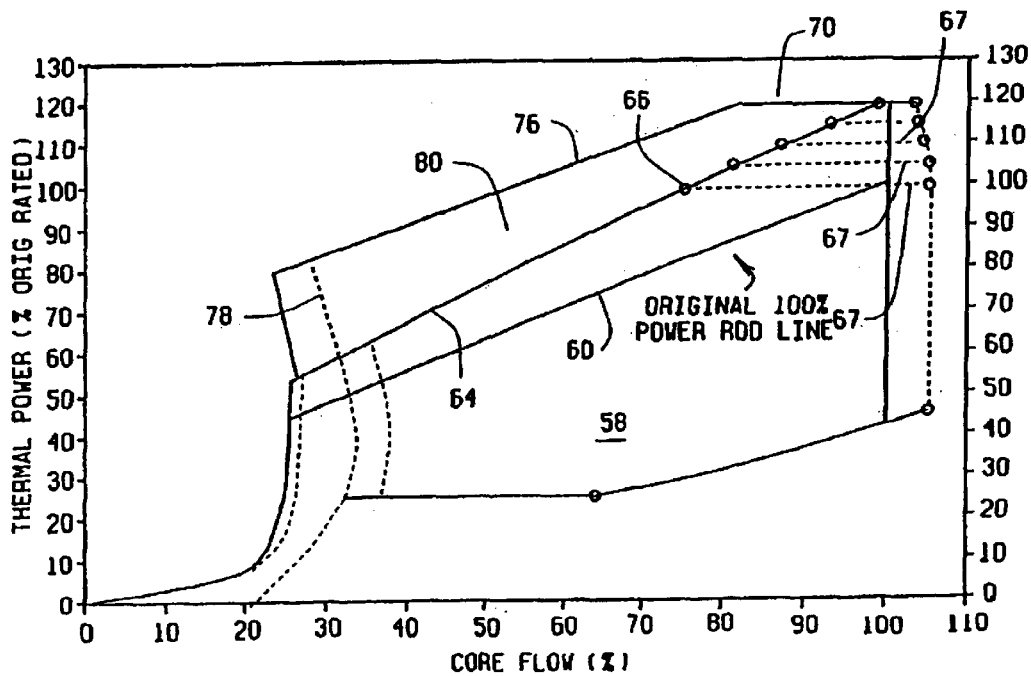
FIG. 4 is a graph of the percent of rated thermal power versus core flow illustrating another expanded operating domain of the boiling water reactor shown in Figure.

FIG. 4 shows another exemplary embodiment of the present invention where method 40 expands operating domain 58 of reactor 10 to an upper boundary represented by the operation of reactor 10 between about 120 percent of original rated thermal power and about 85 percent of rated core flow to about 60 percent of original rated thermal power and about 60 percent of rated core flow. Lines 70, 76 and 78 represents this new upper boundary of an expanded upper operating region 80 of operating domain 58 of reactor 10.

Method 40 provides analyzed limits that permit licensed power operation of reactor 10 at a core flow lower than the constraint on core flow imposed by boundary 64. The increased boundary line 68 permits operation of reactor 10 over a larger core flow range and operating flexibility during startup and at full power. Method 40 further provides savings in fuel cycle costs and faster plant startups due to the increased ability to establish desired full power control rod pattern at partial power conditions. Also provided is reduced cycle average recirculation pumping power consumption resulting in an increase in net station output.

Another embodiment of the invention includes providing analyses and evaluations to generate a safety analysis report as describe above. Additionally, licensing support is provided to the owner, or managing entity, of the boiling water nuclear reactor, along with technical consultation during the implementation of reactor analyses and modifications described above.

While the invention has been described in terms of various specific embodiments, those skilled in the art will recognize that the invention can be practiced with modification within the spirit and scope of the claims.

What is claimed is:

1. A computerized method for expanding an operating domain of a boiling water nuclear reactor, the operating domain characterized by a map of a reactor thermal power and a core flow, the reactor comprising a core having a control rod pattern, said method comprising:
   determining by computer simulation an elevated load line characteristic that permits operation of the reactor between about 120 percent of rated thermal power at about 85 percent of rated core flow to about 100 percent of rated thermal power at about 55 percent of rated core flow;
   performing safety evaluations by computer simulation at the elevated load line to determine compliance with safety design parameters; and
   performing operational evaluations by computer simulation at the elevated load line.

2. A method in accordance with claim 1 wherein computing an elevated load line characteristic that improves reactor performance comprises:
   simulating an increased reactor thermal power to increase load line; and
   evaluating reactor performance by computer simulation.

3. A method in accordance with claim 2 wherein simulating an increased reactor thermal power to increase load line comprises simulating a change in the control rod pattern to increase reactor thermal power.

4. A method in accordance with claim 1 wherein simulating an increased reactor thermal power to increase load line comprises simulating a change in the core flow to increase reactor thermal power.

5. A method in accordance with claim 1 wherein simulating an increased reactor thermal power to increase load line comprises simulating a change in the control rod pattern and simulating a change in the core flow to increase reactor thermal power.

6. A method in accordance with claim 2 further comprising computing a set of operating conditions for the reactor in an upper operating domain characterized by the elevated load line.

7. A method in accordance with claim 1 wherein performing operational evaluations by computer simulation at the elevated load line comprises:

evaluating simulated plant maneuvers;

evaluating simulated frequent plant transients;

evaluating simulated plant fuel operating margins;

evaluating simulated operator training;

evaluating simulated plant equipment response and setpoints.

8. A method in accordance with claim 7 further comprising generating constraints and requirements for plant equipment and plant procedures based on the computer simulation operational evaluations.

9. A method in accordance with claim 7 wherein the reactor further comprises a core recirculation system comprising control components, said method further comprising:

performing a detailed analysis by computer simulation of a performance of the core recirculation system; and performing a detailed analysis by computer simulation of the core recirculation system control components.

10. A method in accordance with claim 8 herein the reactor further comprises flow controls and pressure controls, said method further comprising generating output to facilitate automatic adjustment of the control rod pattern, the flow controls, and the pressure controls based on a detection of a reactor transient.

11. A method in accordance with claim 8 wherein the reactor further comprises pressure controls and computers further comprising generating output to facilitate modifying the reactor process controls and computers to permit the reactor to operate in the expanded operating domain within predetermined safety parameters.

12. A method in accordance with claim 1 further comprising generating output data to facilitate creating a safety analysis report based on the safety evaluations.

* * * * *

UNITED STATES PATENT AND TRADEMARK OFFICE
CERTIFICATE OF CORRECTION

PATENT NO. : 6,721,383 B2
DATED : April 13, 2004
INVENTOR(S) : Casillas et al.

It is certified that error appears in the above-identified patent and that said Letters Patent is hereby corrected as shown below:

Column 6,
Line 35, delete "permits operation of the reactor between" and insert therefor -- defines an upper boundary line of the operating domain, the upper boundary line comprising a first endpoint of --.
Line 37, delete "core flow to" and insert therefor -- core flow and a second endpoint of --.

Column 8,
Line 3, delete "herein" and insert therefor -- wherein --.

Signed and Sealed this

Fourth Day of October, 2005

JON W. DUDAS
*Director of the United States Patent and Trademark Office*